Patented Aug. 22, 1939

2,170,108

UNITED STATES PATENT OFFICE 2,170,108

STABILIZED HYPOCHLORITE SOLUTION AND METHOD THEREFOR

Larry J. Barton, Oakland, Calif., assignor to Clorax Chemical Co., Oakland, Calif., a corporation of Delaware No Drawing. Application April 1, 1936, Serial No. 72,098

6 Claims. (Cl. 23—86)

My invention relates to hypochlorite solutions, and more particularly to a stabilized hypochlorite solution and a method for producing the same.

Hypchlorite solutions, such as sodium hypochlorite, have wide applicability as disinfectants, germicides, and bleaching and cleansing agents. They are generally produced, among other methods, by gassing an aqueous solution of caustic soda or sodium hydroxide with chlorine gas; or by treating calcium hydroxide or lime with chlorine. The bleaching powder or calcium hypochlorite thus produced is added to water and, if desired, the calcium compound is converted to a sodium compound.

Such hypochlorite solutions have, heretofore, been unstable, that is a continuous loss of strength or "available chlorine" has occurred, resulting in evolution of available oxygen from the hypochlorite which, as the oxygen is given off, gradually changes to the chloride salt. For example, sodium hypochlorite (NaOCl) will, upon loss of "available chlorine" or oxygen, change to sodium chloride (NaCl). In the preparation of the hypochlorite solution, it is a known fact that the rate of loss of "available chlorine" or oxygen from the hypochlorite is a function of the ultimate concentration of the hypochlorite solution during preparation thereof i. e., the higher the concentration of hypochlorite in the solution, the greater will be the loss of "available chlorine" or oxygen and the more unstable the preparation will be. The unstability is, however, not proportional to the concentration. In other words, for example, a 5 (five) percent concentration by weight of hypochlorite in solution will lose "available chlorine" or break down 12 to 15 times faster than a 1 (one) percent concentration of hypochlorite in solution.

This condition becomes particularly bothersome with respect to commercial preparation of hypochlorite solutions on a large scale for general uses because, except for certain special kinds of solutions such as those prepared for medicinal purposes and in textile plants for treatment of fabrics where a dilute solution is initially prepared containing about 1 (one) percent of hypochlorite by weight of the solution, it is the commercial practice to produce initially a concentrated solution of the hypochlorite which, after preparation, may or may not be diluted with water in accordance with the purposes to which the solution is to be applied. The commercial preparation of a more or less concentrated solution is economically desirable because it is cheaper to carry out, and the chlorination reaction is more positive than in dilute solutions. Furthermore, the chlorination of initially dilute solutions of alkali metal hydroxide to produce initially dilute solutions of hypochlorite does not make for a stable product inasmuch as, in dilute solutions, a considerable proportion of the chlorine becomes absorbed or dissolved in the water instead of reacting with the alkali metal hydroxide. Later on, this absorbed or dissolved chlorine gradually evolves as a gas from the water, creating unstability.

Although, the above described decomposition of hypochlorite solutions will take place under ordinary conditions, it is usually speeded up by heat, light, and other influences such as agitation usually encountered during packaging and shipment. Heretofore, in an effort to stabilize such hypochlorite solutions, it has been deemed necessary in the art to have an excess of free alkali metal hydroxide such as sodium hydroxide (NaOH) in the solution; the amount of free alkali, heretofore, deemed necessary depending upon the concentration of the hypochlorite solution. In some cases, for a concentrated solution of hypochlorite containing from about 12 (twelve) percent to 22 (twenty-two) percent of hypochlorite by weight of the solution, as much as .7 (seven-tenths) percent to 1 (one) percent of free or excess alkali metal hydroxide by weight of the solution has been employed. For dilute solutions containing about 1 (one) percent of hypochlorite by weight of the solution, as much as .1 (one-tenth) percent of free or excess alkali metal hydroxide by weight of the solution has been used. The patent to Engberg No. 1,883,649 dated October 18, 1932, is an example disclosing the latter concentration.

Thus, it has, heretofore, been deemed necessary to have an amount of free caustic or alkali metal hydroxide present in solution for stabilization purposes ranging from at least about 5 (five) percent to 10 (ten) percent by weight of hypochlorite in the final solution. This ratio of free caustic or alkali metal hydroxide to hypochlorite has even run higher for some solutions of hypochlorite.

The use of a comparatively high percentage of free or excess alkali metal hydroxide in hypochlorite solutions did not provide a desirable degree of stability. For this reason, it has been customary for manufacturers of such solutions to make them stronger than shown on the label of the container therefor, to compensate for any loss of "available chlorine." Furthermore, the presence of the comparatively large quantity of free or excess alkali metal hydroxide was objectionable, since it gave the solution a caustic action undesirable, for example, in laundry work. Also, it caused surfaces wetted with the solution to have a greasy or slippery feeling, particularly objectionable where trays containing such solution were used as foot baths in gymnasiums, swimming pools and locker rooms, for the treatment of the fungus commonly known as "athlete's foot". Moreover, as was previously set forth, in spite of the presence of a comparatively large quantity of free alkali metal hydroxide, the resultant solutions did not have as high a degree of stability as was desirable.

My invention is designed to obviate the foregoing described difficulties, heretofore, encountered in the preparation of hypochlorite solutions, and has as one of its objects the provision of an improved hypochlorite solution and process therefor which will enable the production of very stable hypochlorite solutions at very low cost without the necessity of including substantial quantities of free or excess alkali in the solution, as would cause such solutions to have a caustic effect or to cause surfaces to which it has been applied to have a greasy or slippery feeling.

Another object of my invention is to provide an improved hypochlorite solution which is of such desirable stability that it is not necessary to store it with elaborate precautions to avoid the effect of heat, and also which need not be prepared initially with excessive hypochlorite strength over and above the strength stated upon the label to take care of subsequent decomposition.

Other objects will appear during the course of the following specifications.

Broadly, I have found that, contrary to the prior teachings which deemed it necessary to have comparatively large amounts of free alkali hydroxide or caustic in solution for stabilization purposes, stabilization of the hypochlorite increases as the quantity of free alkali hydroxide approaches zero or is substantially eliminated from the solution. Thus, an ideal stable solution is one which contains no free caustic or alkali hydroxide and is just alkaline enough or non-acid to prevent decomposition of the hypochlorite, which decomposition always occurs in acid solution as is well known. In view of this principle, after formation of a product resulting from the halogenation of an alkali metal hydroxide solution to the point at which the free alkali metal hydroxide is substantially all consumed by the halogenation reaction or in other words approaches zero, any subsequent addition of alkali for stabilization purposes is unnecessary.

Although the best results are obtained with no free or excess alkali hydroxide present in the solution, more stable solutions can be prepared than heretofore possible if some free alkali hydroxide is present, but in lesser quantities than heretofore employed, because stability, I have found, increases as the quantity of free caustic or alkali hydroxide decreases. For certain concentrated commercial solutions initially prepared by my assignee, by halogenation so that the final concentration of hypochlorite after halogenatin is from 12 (twelve) percent to 22 (twenty-two) percent by weight of the solution, it is best that the free caustic or alkali metal hydroxide present, should be not materially in excess of 1 (one-tenth) percent the weight of the solution, or in other words not materially in excess of .8 (eight-tenths) percent the weight of hypochlorite present in solution; the less free alkali metal hydroxide present the greater the stability, as was previously explained. Such solutions, after initial preparation, may or may not be diluted with water, the ratio of the free alkali metal hydroxide present to the hypochlorite present remaining always the same irrespective of the degree of subsequent dilution.

With respect to solutions initially prepared by chlorination and containing less than 12 (twelve) per cent of hypochlorite by weight of final solution, for example a 5 (five) per cent initially prepared hypochlorite solution, the ratio of free alkali hydroxide to hypochlorite may even run higher because, as was previously set forth, stability increases as the initially prepared concentration of hypochlorite to be formed in the solution decreases except for extremely dilute solutions wherein the large excess of water absorbs the chlorine during halogenation. Thus, for solutions initially prepared by halogenating an alkali metal hydroxide to contain an amount of hypochlorite ranging upwardly from 1½ (one and one-half) per cent by weight of the final solution, the concentration of free alkali hydroxide may be not materially in excess of .1 (one-tenth) per cent the weight of the solution. However, it is best that the amount of free caustic or alkali hydroxide be not materially in excess of 2.5 (two and one-half) per cent the weight of hypochlorite. In other words, the ratio of free caustic or alkali hydroxide to hypochlorite should, for best results, not exceed 1:40. For concentrations of hypochlorite in initially prepared solutions containing over 22 (twenty-two) per cent of hypochlorite, the same principles apply, namely the provision of a solution in which the amount of free caustic or alkali hydroxide approximates zero, without the subsequent addition of alkali to the solution for the purposes of stabilization.

Having explained the broad principles of the invention, I shall now explain in detail a method or process by which the invention can be carried out for obtaining an initially concentrated hypochlorite solution. To a suitable vessel which may be concrete, stoneware, glass or porcelain, or a rubber lined vessel, or any other similar type vessel capable of withstanding the corrosive action of concentrated hypochlorite, there is added an aqueous solution of alkali metal hydroxide, such as sodium hydroxide in the commercial form of caustic soda. Caustic soda contains some sodium carbonate and certain other minor impurities. These impurities in the caustic soda have the effect of creating unstability of the hypochlorite. Therefore, it is desirable to utilize as pure a product as can be commercially obtained. A pure product which I have found suitable contains about 98 (ninety-eight) per cent sodium hydroxide, about 2 (two) per cent sodium carbonate, and the rest miscellaneous impurities.

The caustic soda solution may be made of varying strength, depending upon the strength of the hypochlorite solution it is desired to produce. For instance, if it be desired to make a concentrated sodium hypochlorite solution of from 20 (twenty) per cent to 22 (twenty-two) per cent by weight of the solution, the caustic soda solution should have an approximate Baumé of 35° at 60° F.; if it is desired to make a concentrated sodium hypochlorite solution containing from 12 (twelve) per cent to 13 (thirteen) per cent of sodium hypochlorite by weight of the solution, the solution of caustic soda should be made in strength of approximately 24° Baumé at 60° F.

Having prepared the caustic soda solution, the halogenation reaction is begun by passing a stream of chlorine gas into the solution, in accordance with usual practice. Preferably the source of chlorine gas is from electrolytic cells; the gas being diluted with air containing the usual amounts of carbon dioxide and water, to avoid too vigorous a reaction. However, concentrated chlorine gas stored in cylinders may be used if desired. In the preparation of concentrated hypochlorite solutions, the reaction is strongly exothermic which, because of the creation of the heat, tends to break down the hypochlorite as it is being formed. Suitable means, well known to the art in the preparation of concentrated hypochlorite solutions, are, therefore, provided for cooling the solution so as to prevent the temperature from rising above the point at which breaking down of the hypochlorite becomes quite prominent. A suitable maximum temperature is about 100° F.

As the halogenation progresses, a major reaction occurs in which the sodium hydroxide gradually combines with chlorine to form sodium hypochlorite and common salt. Coincident with this major reaction, there are other products formed, such as sodium carbonate, sodium silicate from impurities, sodium chlorate, and so forth. Also, as chlorination proceeds, there becomes less free sodium hydroxide in the solution because of its reaction with the chlorine to produce the hypochlorite. At the point where there is exactly no free sodium hydroxide, or in other words the point at which all the sodium hydroxide has been consumed by the halogenation reaction, the solution is still alkaline because of the presence of sodium carbonate in small amounts of between .5 (five tenths) per cent to .75 (seventy-five hundredths) per cent by weight of the solution, which as the amount of free or unreacted sodium hydroxide approaches zero gradually increases slightly in percentage. The amount of sodium carbonate reaches a maximum at the point where the amount of sodium hydroxide becomes exactly zero. Chlorination beyond this point, then results in a reaction between the sodium carbonate and chlorine to produce further small amounts of hypochlorite, sodium chloride, and sodium acid carbonate or bicarbonate. After all sodium hydroxide has been chlorinated, the reaction should not be carried to the point where there remains no sodium carbonate in the solution because then the solution will become acid and the hypochlorite will break down.

In accordance with my invention, the reaction may be stopped as the amount of unreacted or residual sodium hydroxide approximates zero; a composition of great stability being obtained when the residual sodium hydroxide reaches .1 (one tenth) per cent by weight of the solution. If the reaction is carried to the point where there is no residual sodium hydroxide, an even more stable product results. Upon continued chlorination, the small amount of free sodium carbonate is reacted, and stability increases further. It is, however, well not to proceed to the point where there is less than .1 (one tenth) per cent of sodium carbonate remaining, so as to insure the provision of a slightly alkaline solution, to thereby avoid reaching the acid side. The composition producing the best results, as to stability, is therefore, one which is substantially neutral but only alkaline enough to prevent decomposition of the hypochlorite caused by acid. After stopping the reaction at the desired point, alkali need not be added for the purposes of stabilization.

In order to determine the amount of free caustic or sodium hydroxide as the reaction proceeds, it is necessary to test the solution from time to time by accurate chemical analysis, particularly near the end point of halogenation. This is done by removing various samples of solution at intervals as the reaction proceeds, adding an oxidizing agent to such samples, such as hydrogen peroxide, to break up the hypochlorite and thereby provide for obtaining titration end points with suitable indicators, because the indicators will otherwise be affected by the hypochlorite. The amount of sodium hydroxide can be determined by acid titration employing phenolphthalein as an indicator; and the amount of carbonate can be determined by alkali titration with an indicator such as methyl orange or tetrabromphenolsulfonphthalein.

The resulting initially prepared concentrated hypochlorite solution is stable and will also, upon dilution with water, produce a stable composition. In the preparation of initially dilute solutions, substantially the same procedure can be followed, namely, providing a substantially complete reaction between the alkali hydroxide and the halogen, to thereby provide a final solution substantially caustic or hydroxide free so that the quantity of free caustic approximates zero. However, the cooling of a dilute solution during the halogenation need not be maintained, if at all, to the extent necessary for concentrated solutions, because of the absorption of heat by the larger amounts of water present in a dilute solution. It is undesirable to prepare initially dilute solutions to contain less than 1.5 (one and one-half) per cent of hypochlorite by weight of solution because of the affinity of the water for chlorine which creates unstability, as was previously pointed out.

The preparation of initially concentrated solutions of the hypochlorite is commercially desirable for the reasons already mentioned. Some concentrated solutions are employed direct for some uses without dilution, and after clarification, in the usual manner, they may be placed in proper containers for the market. Where the solution is to be used in concentrated form, for example in laundries, it is preferred to provide a concentration of hypochlorite of about 20 (twenty) per cent to 22 (twenty-two) per cent by weight of the solution. For general household use, de-odorizing, bleaching, cleansing, and so forth, an initially prepared concentrated solution of hypochlorite containing between 12 (twelve) per cent to 13 (thirteen) per cent of hypochlorite by weight of solution is preferably diluted with a sufficient volume of water to provide a final concentration of about 4 (four) per cent to 6 (six) per cent hypochlorite by weight of solution. For diluting, it is desirable to use either distilled water or water which has been treated by some "softening" method. After dilution, it is usually desirable to allow the solution to settle to clearness, or to filter the same, whereupon it is ready for bottling and the ultimate consumer.

A solution prepared in accordance with my invention will be substantially altogether devoid of the greasy or slippery effect above referred to, and it will be relatively highly stable. If the solution is permitted to stand as long as nine months, it will lose only a relatively small amount of its strength, as compared to previously hypochlorite solutions containing relatively large quantities of alkali hydroxide, the loss being usually much less than half that previously experienced.

Although in the specific illustrations given, sodium hydroxide has been mentioned as the source of base or alkali for chlorination, the same principle of providing a substantially caustic or basic hydroxide free final solution, applies to the halogenation of any other alkali metal hydroxide such as potassium hydroxide, or alkaline earth hydroxide such as calcium hydroxide, by any of the other halogens besides chlorine.

I claim:

1. A stable aqueous hypochlorite solution substantially free of basic hydroxide, said solution having a concentration of available chlorine greater than that corresponding to an aqueous solution of sodium hypochlorite having a strength of 3% by weight.

2. A stable aqueous sodium hypochlorite solution substantially free of basic hydroxide, said solution having a strength greater than 1½% by weight, and other alkali present in an amount such that the degree of alkalinity of the solution lies between the points indicated by phenolphthalein and by tetrabromphenolsulfonphthalein after dissipation of the available chlorine present.

3. A stable aqueous hypochlorite solution having a degree of alkalinity between the points indicated by phenolphthalein and by methyl orange after dissipation of the available chlorine present.

4. The process of making a stable, concentrated aqueous solution of a hypohalogenite free of hydroxide, by a single step, which consists essentially in treating a basic aqueous hydroxide solution with free halogen until the amount of said hydroxide present indicates zero, the concentration of said hydroxide being so great that sufficient heat is produced normally to decompose resulting hypohalogenite, and cooling during halogenation sufficiently to prevent such decomposition.

5. The process of making a stable, concentrated aqueous solution of an alkali metal hypochlorite substantially free of hydroxide, by a single step, which consists essentially in treating an aqueous solution of the hydroxide of said alkali metal with chlorine gas until the amount of hydroxide present relative to hypochlorite is not more than in a ratio of 1 to 40, the concentration of said hydroxide being so great that sufficient heat is produced normally to decompose resulting hypochlorite, and cooling during chlorination sufficiently to prevent such decomposition.

6. The method of stabilizing the product resulting from the halogenation of an aqueous basic hydroxide solution of any desired strength by a single step, which comprises controlling by said halogenation the content of free basic hydroxide so that the amount of free basic hydroxide in the final product approximates zero and so that the degree of alkalinity of the final product lies between the points indicated by phenolphthalein and by tetrabromphenolsulfonphthalein.

LARRY J. BARTON.

---

CERTIFICATE OF CORRECTION.

Patent No. 2,170,108. August 22, 1939.

LARRY J. BARTON.

It is hereby certified that the name of the assignee in the above numbered patent was erroneously written and printed as "Clorax Chemical Co." whereas said name should have been written and printed as Clorox Chemical Co., of Oakland, California, a corporation of Delaware, as shown by the record of assignments in this office; page 2, first column, line 73, for the numeral "1" read .1; page 4, first column, line 3, for the word "previously" read previous; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.

CERTIFICATE OF CORRECTION.

Patent No. 2,170,108. August 22, 1939.

LARRY J. BARTON.

It is hereby certified that the name of the assignee in the above numbered patent was erroneously written and printed as "Clorax Chemical Co." whereas said name should have been written and printed as Clorox Chemical Co., of Oakland, California, a corporation of Delaware, as shown by the record of assignments in this office; page 2, first column, line 73, for the numeral "1" read .1; page 4, first column, line 3, for the word "previously" read previous; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.